(12) United States Patent
Park

(10) Patent No.: US 12,379,259 B2
(45) Date of Patent: Aug. 5, 2025

(54) TEMPERATURE SENSOR MODULE AND TEMPERATURE MEASUREMENT SYSTEM COMPRISING THE SAME

(71) Applicant: EXCELLO CO., LTD., Gwangyang-si (KR)

(72) Inventor: Seung Jae Park, Seoul (KR)

(73) Assignees: Seung Jae Park, Seoul (KR); EXCELLO CO., LTD., Gwangyang-si (KR)

( * ) Notice: Subject to any disclaimer, the term of this patent is extended or adjusted under 35 U.S.C. 154(b) by 461 days.

(21) Appl. No.: 17/836,999

(22) Filed: Jun. 9, 2022

(65) Prior Publication Data
US 2023/0047904 A1 Feb. 16, 2023

(30) Foreign Application Priority Data

Aug. 10, 2021 (KR) .................. 10-2021-0105371
Feb. 24, 2022 (KR) .................. 10-2022-0024721

(51) Int. Cl.
*G01K 7/04* (2006.01)
*G01K 1/16* (2006.01)

(52) U.S. Cl.
CPC ............... *G01K 7/04* (2013.01); *G01K 1/16* (2013.01)

(58) Field of Classification Search
CPC .................................. G01K 7/04; G01K 1/16
See application file for complete search history.

(56) References Cited

U.S. PATENT DOCUMENTS

| 8,801,283 B2 | 8/2014 | Ishikawa et al. |
| 2008/0043803 A1 | 2/2008 | Bandoh |
| 2010/0202490 A1* | 8/2010 | Ishikawa .................. G01K 1/14 374/165 |

(Continued)

FOREIGN PATENT DOCUMENTS

| DE | 102010030769 A1 | 5/2012 |
| JP | 58-160324 U | 10/1983 |
| JP | 09-119872 A | 5/1997 |

(Continued)

OTHER PUBLICATIONS

International Search Report of PCT/KR2022/005256 mailed Jul. 8, 2022.

(Continued)

*Primary Examiner* — Mirellys Jagan
(74) *Attorney, Agent, or Firm* — Revolution IP, PLLC

(57) ABSTRACT

A temperature sensor module includes: a sensor unit having a sensing end for measurement of a temperature of a heat source; a heat conduction panel formed of a thermally conductive material and having a temperature measurement region connected to the sensing end and exposed to the heat source, the heat conduction panel collecting heat transferred from the heat source to the temperature measurement region and transmitting the collected heat to the sensing end along a surface of the temperature measurement region; and a heat insulation panel disposed opposite the heat source with respect to the heat conduction panel to prevent heat generated from the heat source or heat transferred to the heat conduction panel from being discharged to an outside of the heat insulation panel or to prevent external heat from being transferred to the heat conduction panel.

7 Claims, 7 Drawing Sheets

(56) References Cited

U.S. PATENT DOCUMENTS

2019/0293721 A1* 9/2019 Tsutsumi .......... G01R 31/2891
2022/0298591 A1* 9/2022 Park ........................ C21B 9/10

FOREIGN PATENT DOCUMENTS

| JP | 2007-157456 A | | 6/2007 |
|---|---|---|---|
| JP | 2011232294 A | * | 11/2011 |
| JP | 2015-055524 A | | 3/2015 |
| JP | 2015-78851 A | | 4/2015 |
| KR | 10-2006-0063405 A | | 6/2006 |

OTHER PUBLICATIONS

Office Action of Japanese Patent Application No. 2022-098759 mailed Aug. 1, 2023.
European Search Report of EP 22177418.5 mailed Nov. 28, 2022.

* cited by examiner

TEMPERATURE SENSOR MODULE AND TEMPERATURE MEASUREMENT SYSTEM COMPRISING THE SAME

FIELD

The present invention generally relates to a temperature sensor module and a temperature measurement system including the same. Particularly, the present invention relates to a temperature sensor module which can be installed in a compact manner in a high-temperature facility not allowing temperature measurement due to inaccessibility to an operator or an external environment thereof, and can quickly and accurately measure the temperature of the high-temperature facility, and a temperature measurement system including the same.

BACKGROUND

Temperature control of a battery in an electric vehicle is very important since the temperature of the battery is directly related to an operating condition and safety of the vehicle. Further, it is very important to control the temperature of a fire-resistant structure used in a high temperature environment, such as a melting furnace that produces molten iron by melting raw materials, such as iron ore and the like, since the operating temperature of the fire-resistant structure is directly related to quality of products.

Accordingly, a temperature sensor is used to provide real-time measurement of the temperature of a sensing target exposed to a high-temperature environment, such as a battery or a fire-resistant structure, in order to maintain an optimal operating environment for the sensing target or to reduce the risk of accidents, such as fire.

However, it is difficult to install a temperature sensor in a sensing target exposed to a high-temperature environment, such as a melting furnace, due to inaccessibility to an operator or a high-temperature environment. In addition, conventional temperature sensors are mostly point temperature sensors that measure the temperature of a specific point on a sensing target, and thus have difficulty in accurately measuring the temperature of a large-area sensing target such as a melting furnace.

Although combined use of many point temperature sensors may be considered in order to accurately measure the temperature of a large-area sensing target, this method has a problem in that it is structurally difficult to install a large number of temperature sensors on the sensing target, and in that it is also structurally difficult to collect sensing results from such a large number of temperature sensors and to process the collected sensing results.

Korean Patent Laid-open Publication No. 2006-0063405 (Issue Date: 2006 Jun. 12) discloses a probe capable of measuring temperature inside of blast furnace.

SUMMARY

Embodiments of the present invention are conceived to solve such problems in the art and it is an object of the present invention to provide a temperature sensor module which can be installed in a compact manner in a high-temperature facility, which does not allow temperature measurement due to inaccessibility to an operator or an external environment thereof, and can quickly and accurately measure the temperature of the high-temperature facility, and a temperature measurement system including the same.

It will be understood that objects of the present invention are not limited to the above. The above and other objects of the present invention will become apparent to those skilled in the art from the detailed description of the following embodiments in conjunction with the accompanying drawings In accordance with one aspect of the present invention, a temperature sensor module includes: a sensor unit having a sensing end for measurement of a temperature of a heat source; a heat conduction panel formed of a thermally conductive material and having a temperature measurement region connected to the sensing end and exposed to the heat source such that heat transferred from the heat source to the temperature measurement region is transferred to the sensing end along a surface of the temperature measurement region; and a heat insulation panel disposed opposite the heat source with respect to the heat conduction panel to prevent heat generated from the heat source or heat transferred to the heat conduction panel from being discharged to an outside of the temperature sensor module or to prevent external heat from being transferred to the heat conduction panel.

The heat conduction panel may include a patterned portion forming at least a portion of the temperature measurement region.

The patterned portion may include: a first patterned portion having a first inner region connected to the sensing end, a first outer region separated a first linear distance from the first inner region, and a first extension connecting the first inner region to the first outer region; and a second patterned portion having a second inner region connected to the sensing end, a second outer region separated from the second inner region by a second linear distance longer than the first linear distance, and a second extension connecting the second inner region to the second outer region.

In one embodiment, the first extension and the second extension may have the same length.

In another embodiment, the first extension and the second extension may have different lengths, wherein the first extension may have a first heat conductivity and the second extension may have a second heat conductivity greater than the first heat conductivity.

In a further embodiment, the first extension and the second extension may have different lengths, wherein the first extension may have a first area and the second extension may have a second area larger than the first area.

The heat conduction panel may further include: a heat collecting portion disposed in the first outer region or the second outer region to collect heat transferred from the heat source, wherein the heat collecting portion may be formed of a material having greater heat conductivity than the first patterned portion and the second patterned portion.

The sensor unit may include: a thermocouple having the sensing end as a hot junction; and a processor connected to a cold junction of the thermocouple and performing temperature calculation from thermoelectromotive force depending on a temperature of the thermocouple.

In accordance with another aspect of the present invention, there is provided a temperature measurement system including: the temperature sensor module set forth above; and a management module receiving temperature information measured and processed by the temperature sensor module and displaying a temperature of the temperature measurement region.

With the heat conduction panel connected to the sensing end and extending parallel to the surface of the temperature measurement region, the temperature sensor module according to the present invention can quickly and accurately measure and process information about the temperature of a heat source or a structure filled with the heat source, thereby allowing stable and systematic management of the heat source or the structure filled with the heat source based on the acquired temperature information.

It will be understood that advantageous effects of the present invention are not limited to the above and include any advantageous effects conceivable from the features disclosed in the detailed description of the present invention or the appended claims.

DRAWINGS

The above and other aspects, features, and advantages of the present invention will become apparent from the detailed description of the following embodiments in conjunction with the accompanying drawings.

DETAILED DESCRIPTION

Figure 1:
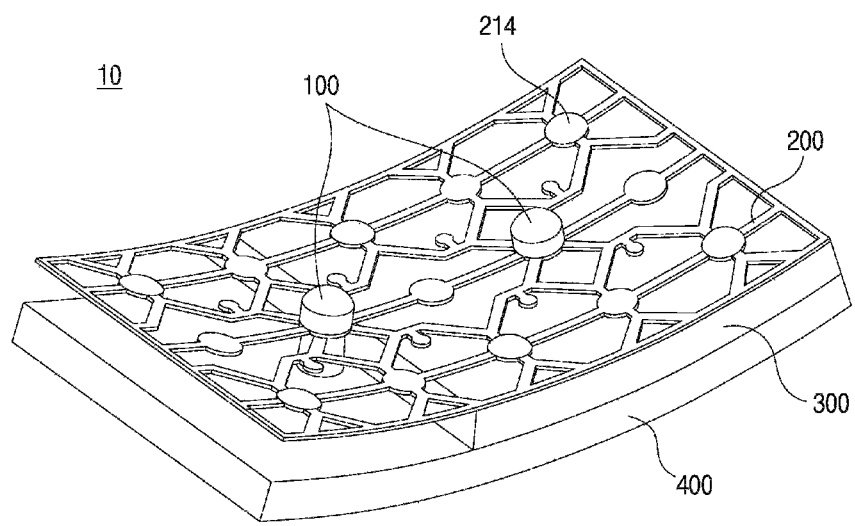
FIG. 1 is a schematic perspective view of a temperature sensor module according to one embodiment of the present invention.

Hereinafter, preferred embodiments of the present invention will be described with reference to the accompanying drawings. In description of the embodiments, the same components will be denoted by the same terms and the same reference numerals and repeated description thereof will be omitted.

Throughout the specification, when an element or layer is referred to as being "on," "connected to," or "coupled to" another element or layer, it may be directly on, connected to, or coupled to the other element or layer or intervening elements or layers may be present. In addition, unless stated otherwise, the term "includes" should be interpreted as not excluding the presence of other components than those listed herein.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Figure 2:
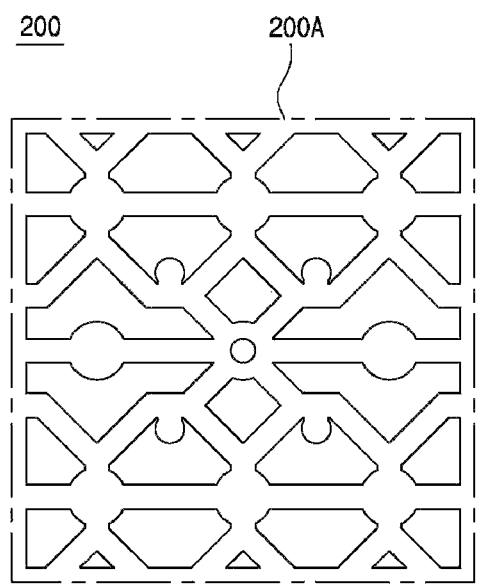
FIG. 2 is a plan view of a temperature measurement region of a heat conduction panel according to one embodiment of the present invention.

FIG. 1 is a schematic perspective view of a temperature sensor module according to one embodiment of the present invention, and FIG. 2 is a plan view of a temperature measurement region of a heat conduction panel of FIG. 1.

Referring to FIG. 1 and FIG. 2, the temperature sensor module 10 according to this embodiment may include a sensor unit 100, a heat conduction panel 200, and a heat insulation panel 300.

A heat source that generates heat may be in any state, that is, may be a liquid, gas, or solid. For example, the heat source may be a battery of an electric vehicle, a fire-resistant structure of a melting furnace that produces molten iron by melting a raw material, or a hot gas with which the fire-resistant structure of the melting furnace is filled.

The sensor unit 100 may have a sensing end 110 (see FIG. 3) for measurement of the temperature of the heat source.

One sensing end 110 may be disposed in each temperature measurement region 200A.

In one embodiment, the sensor unit 100 may include a thermocouple having the sensing end 110 as a hot junction and a processor connected to a cold junction of the thermocouple and performing temperature calculation from thermoelectromotive force depending on the temperature of the thermocouple.

Specifically, the thermocouple consists of two wires of different metals joined at both ends such that current flows between the wires due to a temperature difference between a hot junction (a junction at the temperature to be measured), which is one contact point between the wires, and a cold junction (a junction at a fixed temperature), which is the other contact point between the wires. Here, the hot junction of the thermocouple may correspond to the sensing end 110. The thermocouple including the hot junction may be embedded in and protected by a cover member such as a tube.

The processor may acquire information about an actual temperature at the hot junction from relation between thermoelectromotive force generated by the thermocouple and a temperature difference between the hot junction and the cold junction of the thermocouple. As the processor, a voltmeter may be used. It should be understood that the present invention is not limited thereto and the sensor unit 100 may include various other well-known temperature sensors apart from the thermocouple depending on the type of heat source to be measured.

The sensor unit 100 may further include a first communication unit. The first communication unit may transmit the temperature information measured and processed by the sensor unit 100 to an external management module 20 (see FIG. 9) and may receive a control signal from the management module 20.

The heat conduction panel 200 may be formed of a thermally conductive material.

The heat conduction panel 200 may have a temperature measurement region 200A connected to the sensing end 110 of the sensor unit 100 to be exposed to the heat source. The heat conduction panel 200 collects heat transferred from the heat source to the temperature measurement region 200A and transmits the collected heat to the sensing end 110 of the sensor unit 100 along a surface of the temperature measurement region 200A.

The temperature measurement region 200A may be a region defined by a virtual outline extending along an edge of the heat conduction panel 200. The temperature measurement region 200A of the heat conduction panel 200 may be divided into multiple temperature measurement regions 200A by virtual division lines.

In one embodiment, the heat conduction panel 200 may have a patterned portion. The patterned portion may have a generally uniform pattern centered on the sensing end 110 and extending to an edge of the temperature measurement region 200A.

The patterned portion may form at least a portion of the temperature measurement region 200A. That is, the heat conduction panel 200 may completely cover the heat insulation panel 300 described below in plan view, wherein the patterned portion may cover only a portion of the heat insulation panel 300.

The patterned portion may include an inner region connected to the sensing end 110 of the sensor unit 100, an outer region spaced apart from the inner region, and an extension connecting the inner region to the outer region. Here, the inner region may correspond to a region relatively close to the sensing end 110 and the outer region may correspond to the edge of the temperature measurement region 200A. The patterned portion will be described in detail further below.

The heat conduction panel 200 may further include a heat collecting portion 214. The heat collecting portion 214 may be formed of a material having a different heat conductivity than the patterned portion, and may have greater heat conductivity than the patterned portion. The heat collecting portion 214 may be disposed in the outer region of the patterned portion. Accordingly, heat generated from the heat source can be transferred more quickly to the outer region of the patterned portion, in which the heat collecting unit 214 is disposed.

The heat insulation panel 300 may be disposed on the other surface of the heat conduction panel 200 and may be located opposite the heat source with respect to the heat conduction panel 200.

This heat insulation panel 300 prevents heat generated from the heat source or heat transferred to the heat conduction panel 200 from being discharged to the outside of the heat insulation panel 300 while preventing external heat from being transferred to the heat conduction panel 200 and the sensing end 110. As such, the heat insulation panel 300 can increase accuracy of temperature measurement by blocking transfer of external heat to the sensing end 110 and the heat conduction panel 200.

The temperature sensor module 10 may further include a panel support plate 400. The panel support plate 400 may be disposed on one surface of the heat insulation panel 300 and may securely support the heat insulation panel 300.

The panel support plate 400, the heat insulation panel 300, and the heat conduction panel 200 may form a stack structure. The stack structure of the panel support plate 400, the heat insulation panel 300, and the heat conduction panel 200 may be a part of a structure housing the heat source. In addition, the stack structure of the panel support plate 400, the heat insulation panel 300, and the heat conduction panel 200 may have a flat or curved shape corresponding to the shape of the structure housing the heat source. Further, the stack structure of the panel support plate 400, the heat insulation panel 300, and the heat conduction panel 200 may be formed of a flexible material.

As described above, with the heat conduction panel 200 forming at least a portion of the temperature measurement region 200A, the temperature sensor module 10 according to this embodiment can quickly and accurately measure the temperature of the temperature measurement region 200A.

Next, the heat conduction panel having a patterned portion according to various embodiments of the present invention will be described in detail with reference to FIG. 3 to FIG. 8.

Figure 3:
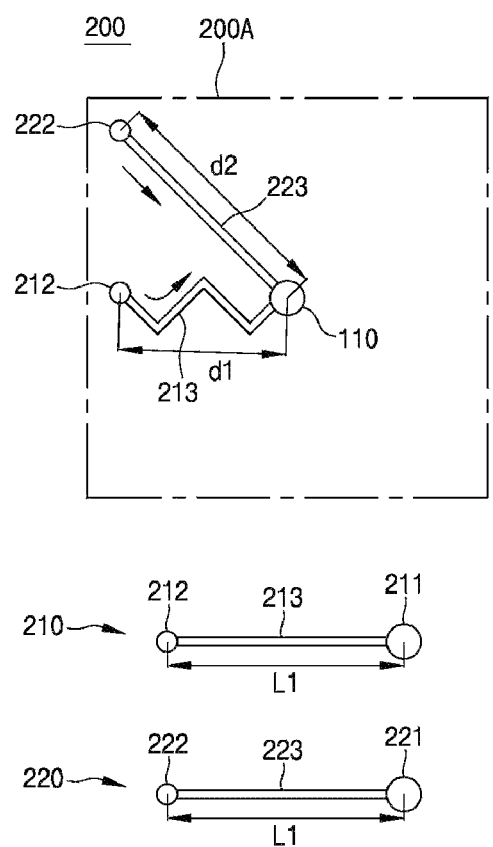
FIG. 3 is a plan view of a patterned portion of the heat conduction panel according to a first embodiment of the present invention.

FIG. 3 is a plan view of a patterned portion of the heat conduction panel according to a first embodiment of the present invention.

Referring to FIG. 3, the heat conduction panel 200 according to this embodiment may include a patterned portion.

The patterned portion may include a first patterned portion 210 and a second patterned portion 220.

The first patterned portion 210 may have a first inner region 211, a first outer region 212, and a first extension 213.

The first inner region 211 may be disposed at a center of the temperature measurement region 200A, and may be connected to the sensing end 110 of the sensor unit 100.

The first outer region 212 may be disposed at an outer edge of the temperature measurement region 200A, and may be separated from the first inner region 211 by a first linear distance d1.

The first extension 213 may connect the first inner region 211 to the first outer region 212. The first extension 213 may have a longer length than a distance between the first outer region 212 and the first inner region 211, that is, the first linear distance d1. For example, the first extension 213 may extend from the first inner region 211 to the first outer region 212 in an irregular shape such as a zigzag shape or an arc shape in plan view.

The second patterned portion 220 may have a second inner region 221, a second outer region 222, and a second extension 223.

The second inner region 221 may be disposed at the center of the temperature measurement region 200A, and may be connected to the sensing end 110 of the sensor unit 100.

The second outer region 222 may be disposed at the outer edge of the temperature measurement region 200A, and may be separated from the second inner region 221 by a second linear distance d2. Here, the second linear distance d2 may be longer than the first linear distance d1.

The second extension 223 may connect the second inner region 221 to the second outer region 222. The second extension 223 may have a longer length than the second linear distance d2. For example, the second extension 223 may extend from the second inner region 221 to the second outer region 222 in an irregular shape such as a zigzag shape or an arc shape in plan view.

According to this embodiment, regardless of the difference between the first linear distance d1 and the second linear distance d2, the first extension 213 and the second extension 223 may have the same length L1. That is, since there is a difference between the first linear distance d1 and the second linear distance d2, the first extension 213 and the second extension 223 extend in different shapes to have the same length L1, as shown in FIG. 3.

By setting the lengths of the first extension 213 and the second extension 223 to the same value L1, it is possible to compensate for a difference between a heat transfer rate from the first outer region 212 to the sensing end 110 and a heat transfer rate from the second outer region 222 to the sensing end 110 due to the difference between the linear distances d1, d2. Here, the heat transfer rate means the amount of heat transferred per unit time.

In addition, heat transferred from the heat source to the first outer region 212 and heat transferred from the heat source to the second outer region 222 can reach the sensing end 110 at the same time after moving along the first extension 213 and the second extension 223, respectively. Accordingly, the sensor unit 100 can quickly and accurately measure the temperature of the temperature measurement region 200A in a specific amount of time.

When the temperature measurement region 200A of the heat conduction panel 200 has a square shape in plan view and the sensing end 110 is disposed at the center of the temperature measurement region, as shown in FIG. 3, heat transferred to a side of the temperature measurement region, which is relatively close to the sensing end 110, and heat transferred to a corner of the temperature measurement region, which is relatively far from the sensing end 110, can reach the sensing end 110 at the same time after moving along the first extension 213 and the second extension 223, respectively.

Figure 4:
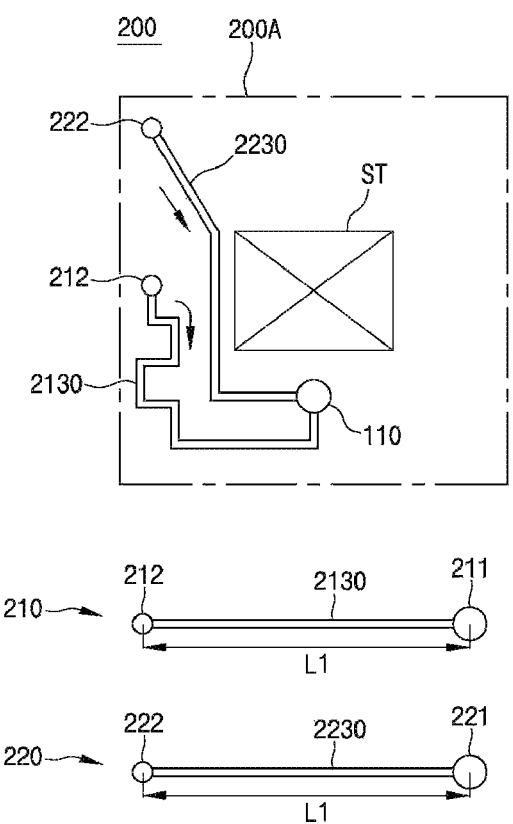
FIG. 4 is a plan view of a modification of the patterned portion of FIG. 3.

FIG. 4 is a plan view of a modification of the patterned portion of FIG. 3.

Referring to FIG. 4, an interference structure ST may be disposed at a center of the temperature measurement region 200A defined by the heat conduction panel 200 depending on the type of heat source or the condition of a fire-resistant structure filled with the heat source. Accordingly, the sensing end 110 of the sensor unit 100 needs to be disposed offset from the center of the temperature measurement region 200A.

Even when the sensing end 110 of the sensor unit 100 is disposed offset from the center of the temperature measurement region 200A, heat transferred to the first outer region 212 separated the first linear distance d1 from the sensing end 110 and heat transferred to the second outer region 212 separated the second linear distance d2 from the sensing end 110 can reach the sensing end 110 at the same time after moving along a first extension 2130 and a second extension 2230, respectively. Accordingly, the sensor unit 100 can quickly and accurately measure the temperature of the temperature measurement region 200A in a specific amount of time.

Figure 5:
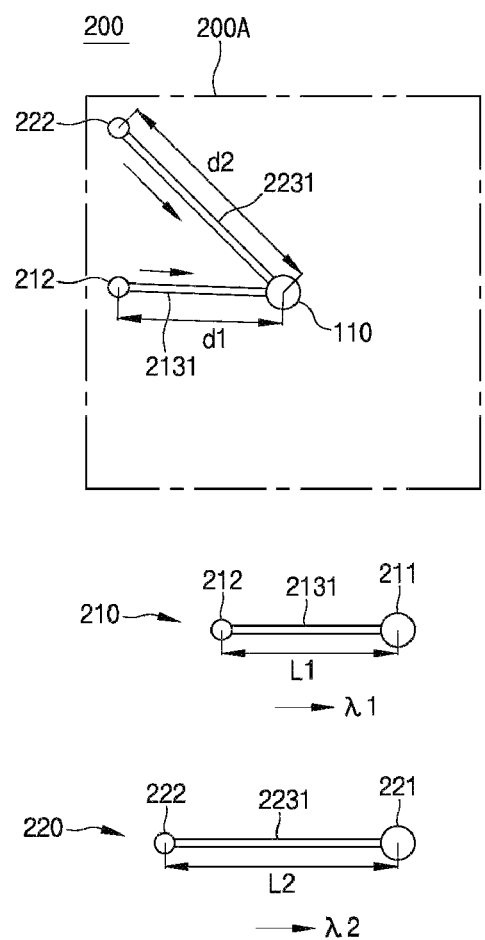
FIG. 5 is a plan view of a patterned portion of the heat conduction panel according to a second embodiment of the present invention.

FIG. 5 is a plan view of a patterned portion of the heat conduction panel according to a second embodiment of the present invention.

Referring to FIG. 5, the patterned portion according to this embodiment may include a first patterned portion 210 and a second patterned portion 220, like the patterned portion described above. In addition, the first patterned portion 210 may have a first inner region 211, a first outer region 212, and a first extension 2131, and the second patterned portion 220 may have a second inner region 221, a second outer region 222, and a second extension 2231. Repeated description thereof will be omitted.

According to this embodiment, the first extension 2131 and the second extension 2231 have different lengths corresponding to the difference between the first linear distance d1 and the second linear distance d2. Here, the first extension 2131 and the second extension 2231 may be formed of different materials having different heat conductivities. That is, the first extension 2131 may have a first heat conductivity λ1 and the second extension 2231 may have a second heat conductivity λ2 greater than the first heat conductivity λ1.

By setting the heat conductivities of the first extension 2131 and the second extension 2231 to different values, it is possible to compensate for a difference between a heat transfer rate from the first outer region 212 to the sensing end 110 and a heat transfer rate from the second outer region 222 to the sensing end 110 due to the difference between the linear distances d1, d2.

Figure 6:
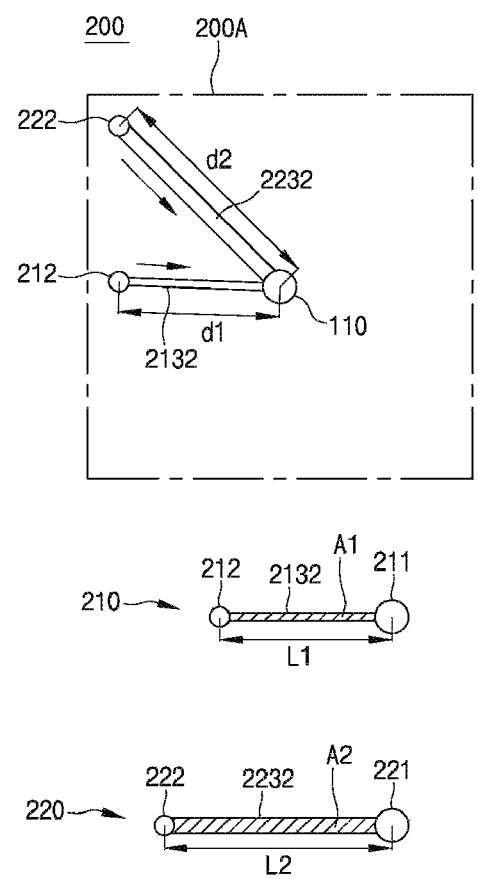
FIG. 6 is a plan view of a patterned portion of the heat conduction panel according to a third embodiment of the present invention.

FIG. 6 is a plan view of a patterned portion of the heat conduction panel according to a third embodiment of the present invention.

Referring to FIG. 6, the patterned portion according to this embodiment may include a first patterned portion 210 and a second patterned portion 220, like the patterned portion described above. In addition, the first patterned portion 210 may have a first inner region 211, a first outer region 212, and a first extension 2132, and the second patterned portion 220 may have a second inner region 221, a second outer region 222, and a second extension 2232. Repeated description thereof will be omitted.

According to this embodiment, the first extension 2132 and the second extension 2232 may have different lengths corresponding to the difference between the first linear distance d1 and the second linear distance d2. Here, the first extension 2132 and the second extension 2232 may have different areas. That is, the first extension 2132 may have a first area A1 and the second extension 2232 may have a second area A2 larger than the first area A1.

By setting the areas of the first extension 2132 and the second extension 2232 to different values, it is possible to compensate for a difference between a heat transfer rate from the first outer region 212 to the sensing end 110 and a heat transfer rate from the second outer region 222 to the sensing end 110 due to the difference between the linear distances d1, d2.

Figure 7:
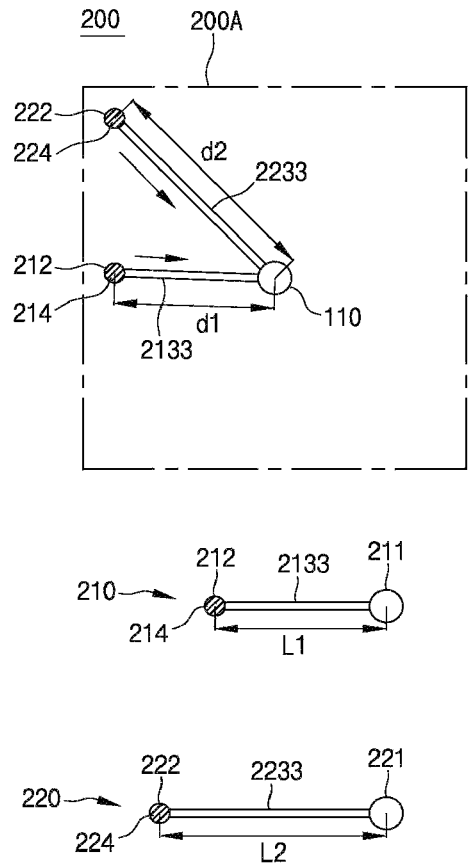
FIG. 7 is a plan view of a patterned portion of the heat conduction panel according to a fourth embodiment of the present invention.

FIG. 7 is a plan view of a patterned portion of the heat conduction panel according to a fourth embodiment of the present invention.

Referring to FIG. 7, the patterned portion according to this embodiment may include a first patterned portion 210 and a second patterned portion 220, like the patterned portion described above. The first patterned portion 210 may have a first inner region 211, a first outer region 212, and a first extension 2133, and the second patterned portion 220 may have a second inner region 221, a second outer region 221, and a second extension 2233. In addition, the first patterned portion 210 may further have a first heat collecting portion 214 disposed in the first outer region 212, and the second patterned portion 220 may further have a second heat collecting portion 224 disposed in the second outer region 222.

According to this embodiment, the first extension 2133 and the second extension 2233 may have different lengths corresponding to the difference between the first linear distance d1 and the second linear distance d2. Here, the first heat collecting portion 214 and the second heat collecting portion 224 may be formed of different materials having different heat conductivities. That is, the first heat collecting portion 214 may have a third heat conductivity and the second heat collecting portion 224 may have a fourth heat conductivity greater than the third heat conductivity.

By setting a temperature difference between the first inner region 211 and the first outer region 212 differently from a temperature difference between the second inner region 221 and the second outer region 222 through disposition of different materials having different heat conductivities in the first outer region 212 and the second outer region 222, respectively, it is possible to compensate for a difference between a heat transfer rate from the first outer region 212 to the sensing end 110 and a heat transfer rate from the second outer region 222 to the sensing end 110 due to the difference between the linear distances d1, d2.

In addition, due to the presence of the first heat collecting portion 214 and the second heat collecting portion 224, heat generated from the heat source can be quickly transferred to the outer region of the heat conduction panel 200 and thus takes less time to reach the sensing end 110.

In the embodiments described with reference to FIG. 3 to FIG. 7, settings for the lengths, heat conductivities, and areas of the first extension and the second extension are described as being regulated individually during formation of the first patterned portion 210 and the second patterned portion 220. However, it should be understood that the present invention is not limited thereto and compensation for the difference between heat transfer rates through the first extension and the second extension may be achieved by regulating at least one of the settings for the lengths, heat conductivities, and areas of the first extension and the second extension during formation of the first patterned portion 210 and the second patterned portion 220. In addition, the settings for the lengths, heat conductivities, and areas of the patterned portions of the heat conduction panel 200 may be appropriately varied depending on the type of heat source, the type of structure filled with the heat source, and the installation position of the sensing end 110.

Figure 8:
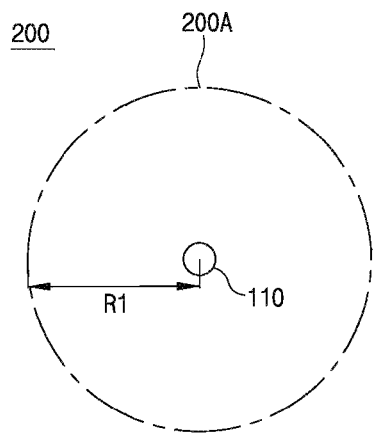
FIG. 8 is a plan view of a heat conduction panel without any patterned portion according to a fifth embodiment of the present invention.

FIG. 8 is a plan view of a heat conduction panel without any patterned portion according to a fifth embodiment of the present invention.

Referring to FIG. 8, the heat conduction panel 200 according to this embodiment does not have any patterned portion, and may be in the form of a flat plate corresponding in shape to a temperature measurement region 200A.

That is, the temperature measurement region 200A according to this embodiment may have a circular shape, wherein the sensing end 110 of the sensor unit 100 may be disposed at a center of the temperature measurement region 200A. The heat conduction panel 200 may have a circular shape having a constant radius R1 about the sensing end 110, corresponding to the circular temperature measurement region 200A.

Despite having no patterned portion, the circular heat conduction panel 200 having a constant radius R1 about the sensing end 110 can ensure a uniform heat transfer rate from an outer region of the heat conduction panel 200 to the sensing end 110. In addition, heat transferred from the heat source to different points of the outer region of the heat conduction panel 200 can reach an inner region connected to the sensing end 110 at the same time.

However, it should be understood that the present invention is not limited thereto and the circular heat conduction panel 200 having a constant radius R1 about the sensing end 110 may also have a patterned portion. Here, the patterned portion may have a radial pattern consisting of multiple sections extending from the inner region connected to the sensing end 110 to the outer region and having the same length, area, and heat conductivity. Accordingly, heat transferred from the heat source to the outer region of the heat conduction panel 200 can more quickly reach the inner region connected to the sensing end 110.

Next, a temperature measurement system according to one embodiment of the present invention will be described.

Figure 9:
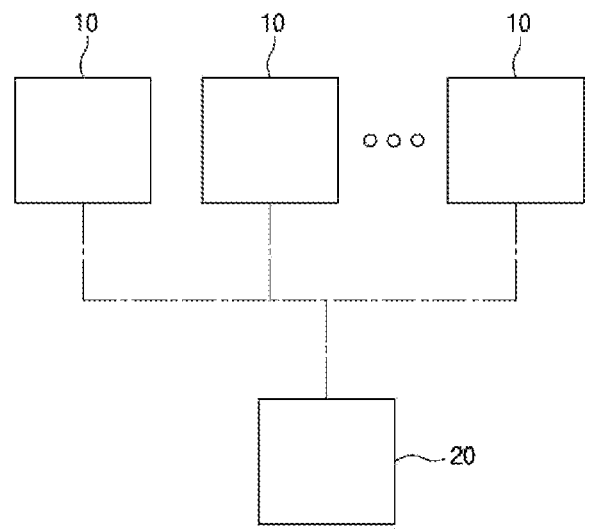
FIG. 9 is a block diagram of a temperature measurement system according to one embodiment of the present invention.

FIG. 9 is a block diagram of a temperature measurement system according to one embodiment of the present invention.

Referring to FIG. 9, the temperature measuring system according to this embodiment may include a temperature sensor module 10 and a management module 20.

As the temperature sensor module, the temperature sensor module 10 described above may be used.

The management module 20 may include a second communication unit. The second communication unit may receive temperature information measured and processed by the sensor unit 100 and may transmit a control signal to the sensor unit 100.

In addition, the management module 20 may process the temperature information measured and processed by the temperature sensor module 10 and may display information about the temperature of the temperature measurement region 200A in the form of various outputs.

A manager who operates the management module 20 can effectively manage the operating state of a heat source or a fire-resistant structure filled with the heat source through monitoring of the temperature of the temperature measurement region 200A displayed on the management module 20.

The management module 20 may be a computer, or may be a tablet PC or smartphone that a manager can carry.

Although exemplary embodiments have been described herein, it should be understood that these embodiments are provided for illustration only and are not to be construed in any way as limiting the present invention, and that various modifications, changes, or alterations can be made by those skilled in the art without departing from the spirit and scope of the invention.

LIST OF REFERENCE NUMERALS

10: Temperature sensor module
100: Sensor unit
110: Sensing end
200: Heat conduction panel
300: Heat insulation panel
20: Management module

The invention claimed is:

1. A temperature sensor module comprising:
   a sensor unit having a sensing end for measurement of a temperature of a heat source;
   a heat conduction panel formed of a thermally conductive material and having a temperature measurement region connected to the sensing end and exposed to the heat source such that heat transferred from the heat source to the temperature measurement region is transferred to the sensing end along a surface of the temperature measurement region; and
   a heat insulation panel disposed opposite to the heat source with respect to the heat conduction panel to prevent heat generated from the heat source or heat transferred to the heat conduction panel from being discharged to an outside of the heat insulation panel or to prevent external heat from being transferred to the heat conduction panel,
   wherein the heat conduction panel comprises a patterned portion forming at least a portion of the temperature measurement region,
   wherein the patterned portion comprises:
   a first patterned portion having a first inner region connected to the sensing end, a first outer region separated a first linear distance from the first inner region, and a first extension connecting the first inner region to the first outer region; and
   a second patterned portion having a second inner region connected to the sensing end, a second outer region separated from the second inner region by a second linear distance longer than the first linear distance, and a second extension connecting the second inner region to the second outer region.

2. The temperature sensor module according to claim 1, wherein the first extension and the second extension have the same length.

3. The temperature sensor module according to claim 1, wherein the first extension and the second extension have different lengths, the first extension having a first heat conductivity, and the second extension having a second heat conductivity greater than the first heat conductivity.

4. The temperature sensor module according to claim 1, wherein the first extension and the second extension have different lengths, the first extension having a first area, and the second extension having a second area larger than the first area.

5. The temperature sensor module according to claim 1, wherein the heat conduction panel further comprises: a heat collecting portion disposed in the first outer region or the second outer region to collect heat transferred from the heat source, the heat collecting portion being formed of a material having greater heat conductivity than the first patterned portion and the second patterned portion.

6. A temperature measurement system comprising:
the temperature sensor module according to claim 1; and
a management module receiving temperature information measured and processed by the temperature sensor module and displaying a temperature of the temperature measurement region.

7. A temperature sensor module comprising:
a sensor unit having a sensing end for measurement of a temperature of a heat source;
a heat conduction panel formed of a thermally conductive material and having a temperature measurement region connected to the sensing end and exposed to the heat source such that heat transferred from the heat source to the temperature measurement region is transferred to the sensing end along a surface of the temperature measurement region; and
a heat insulation panel disposed opposite to the heat source with respect to the heat conduction panel to prevent heat generated from the heat source or heat transferred to the heat conduction panel from being discharged to an outside of the heat insulation panel or to prevent external heat from being transferred to the heat conduction panel,
wherein the sensor unit comprises a thermocouple having the sensing end as a hot junction and a processor connected to a cold junction of the thermocouple and performing a temperature calculation from a thermo-electromotive force depending on a temperature of the thermocouple.

\* \* \* \* \*